Feb. 2, 1937.   J. D. MORGAN   2,069,325
PROCESS AND MECHANISM FOR SEPARATING INTERMIXED DIVIDED MATERIALS
Filed Aug. 5, 1931   2 Sheets-Sheet 1

INVENTOR
John D Morgan

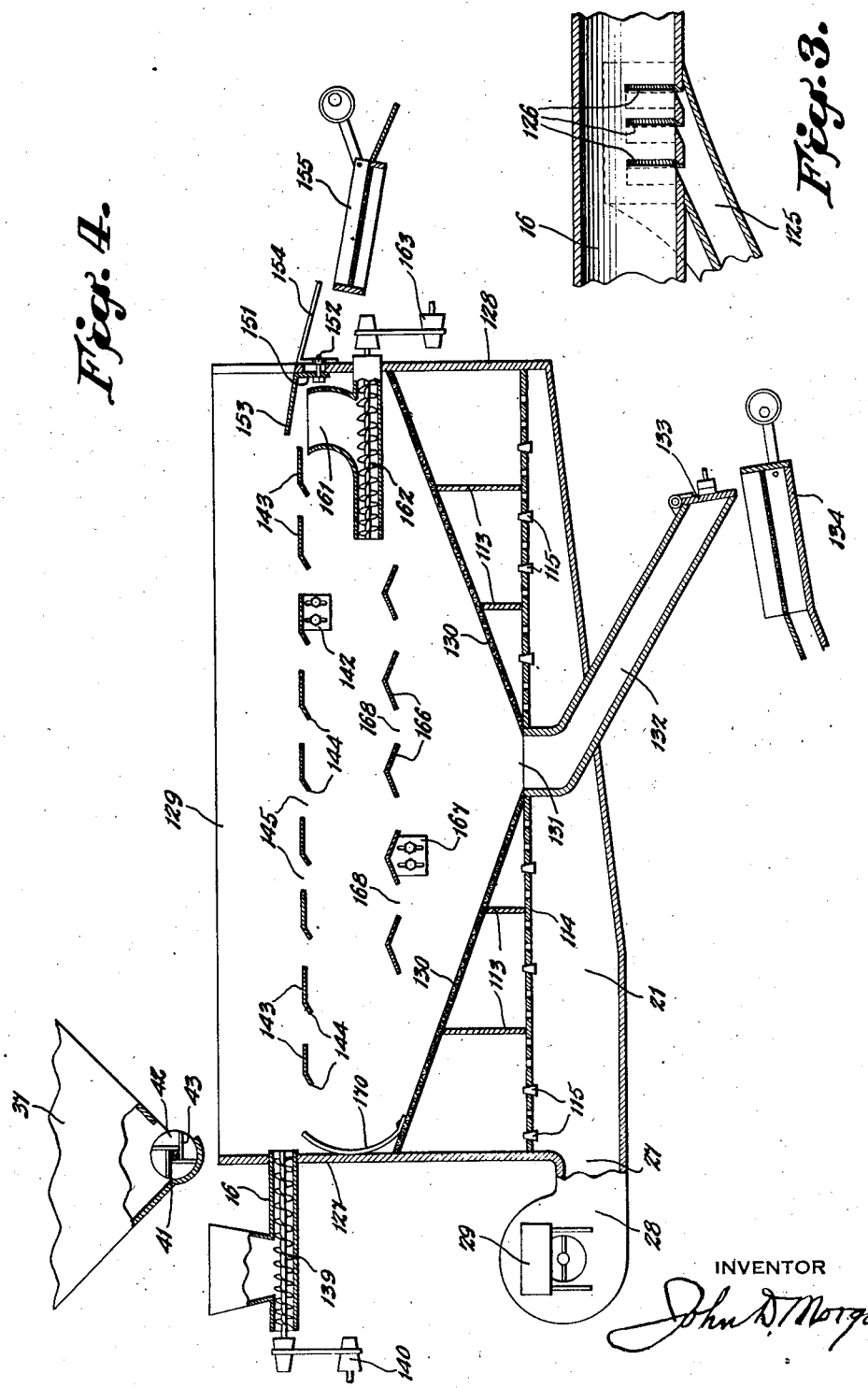

Patented Feb. 2, 1937

2,069,325

UNITED STATES PATENT OFFICE

2,069,325

PROCESS AND MECHANISM FOR SEPARATING INTERMIXED DIVIDED MATERIALS

John D. Morgan, Summit, N. J., assignor to Richard Peale, Clearfield, Pa., W. Sanders Davies, New York, N. Y., and William B. Oakes, Rutherford, N. J., as trustees Application August 5, 1931, Serial No. 555,160

12 Claims. (Cl. 209—474)

The invention relates to a novel and useful process and mechanism for separating intermixed, divided materials, and more particularly to a novel and useful mechanism and process for purifying raw, run-of-the-mine coal.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 3 is a detached detail of an air infiltration device;

Fig. 4 is a longitudinal vertical section of a modified form of the mechanism.

Figure 2:
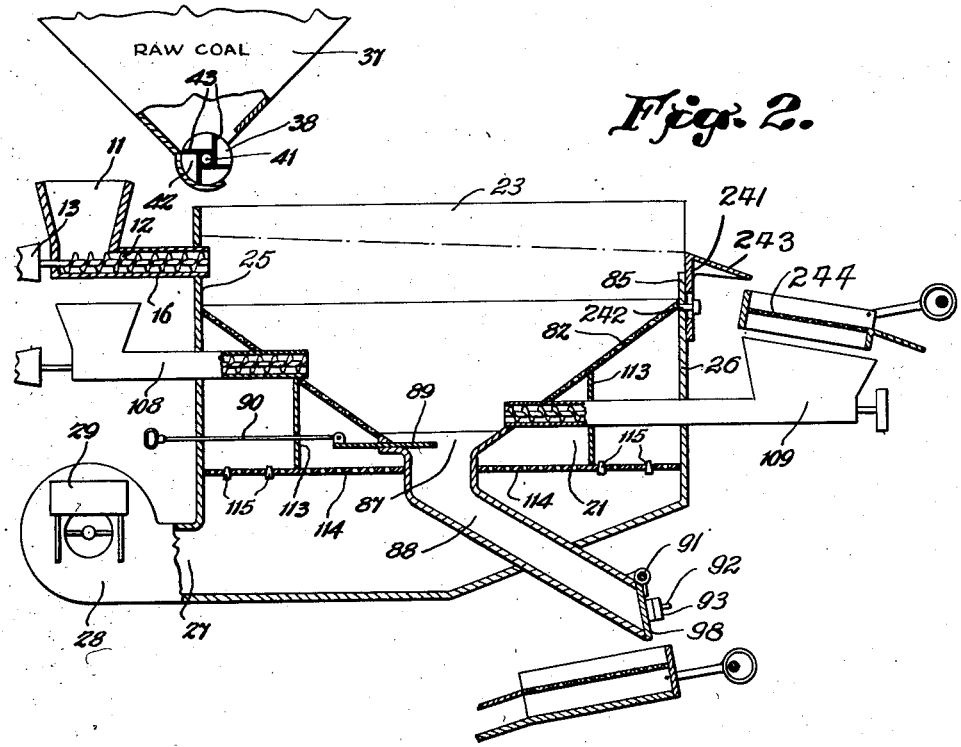
Fig. 2 is a vertical longitudinal section through said mechanism.

The invention relates to a novel and improved process and mechanism especially capacitated for separating intermixed broken, or other finely divided, materials varying widely in range of sizes of the pieces or particles, and some at least of the intermixed materials varying but little in their specific gravities. An intermixture of this kind to which the invention is particularly applicable, is raw or impure coal as it comes from the mine, with only the very large lumps or pieces crushed or removed. That is, effective and satisfactory commercial purification of such coal is effected without the costly and cumbersome pre-sizing which is widely practiced, and which has been necessary in the greater part of the prior art processes and mechanisms.

Due to the concurrent wide size range of the pieces, and the close approximation in specific gravities of the intermixed materials, successful and efficient commercial separation, such as purification of run-of-mine coal above-referred to, presents a problem of great practical difficulty, especially in view of the commercial requirements for an exceedingly close approximation to the washability curves, or float-and-sink tests.

The invention, both as to process and apparatus, employs as the separating agency or medium a dry, particulate fluid or fluid agency, of variably predeterminable specific gravity. I employ as the present preferred form, a dry, finely-divided or otherwise particulate material through which air, or other gas, is infiltrated to render it thoroughly fluid, and in such regulated proportion as to secure a specific gravity which will establish and maintain the desired splitting point for the particular coal being purified.

The most efficient dry fluid medium, so far as now known, consists of finely particulate materials, such as sand or very fine coal, into which a regulated quantity of air is infiltrated to impart practically complete fluid properties to the infiltrated material, and at the same time to give a specific gravity to the dry fluid medium between that of the lightest material of one separated group and that of the heaviest material of the other separated group, or a specific gravity which in cooperation with currents or flowage movement likewise created in the fluid medium will effect a separation of the intermixed materials at the required or desired splitting point.

By my invention there are brought together predeterminedly proportioned, positively fed quantities or volumes of raw coal and of the fluidic separating medium, with regulated infiltration of air into the fluidic material, to impart fuller fluidic properties, and a predetermined or necessary specific gravity thereto. A selectively variable amount of head is also imposed on the fluidic medium. There is thus created a positively impelled forwardly flowing current of desired depth, velocity and direction of the fluidic medium bearing a proportioned stream or bed of coal undergoing separation and purification. These conditions cooperate to create efficient separation of the materials at the desired specific gravity splitting point, and also to impart an adequate and relatively great propulsive forward effect to the bed or layer of coal, or other material, and imposing on the bed of coal a dynamic and agitational separating action of the fluidic medium, while involving in the dynamic or en masse movement only a comparatively small quantity of the fluidic medium. This current action of the proportioned quantity of fluidic medium greatly increases the separating efficiency and capacity of the mechanism, and at the same time circulation and other handling of only a minimum quantity of the fluidic medium is necessitated.

In present preferred practice, the raw coal and the fluidic separating medium are positively fed in regulated predetermined proportions into a bed, the coal being supported on, and the separation and purification taking place, in connection with and by reason of, the flowage or current of the air infiltrated fluidic medium of definite, regulated depth and velocity. All these factors will be fixed or maintained at the highest practicable efficiency for a particular raw coal being cleaned; that is, to effect purification as closely as possible to the washability curve, and also with the minimum amount of flowage, handling and recirculation of the fluidic separating medium. By this positive proportional feed of the raw coal and fluidic separating medium, all the conditions can be correlated nicely and accurately for efficient separation despite the wide variations of various raw coals as to such items or factors as proportion of coarse and fines, percentage of free ash, physical nature of impurities, relative proportions of impurities in coarse and fines, and other factors which may be present, in various conditions and proportions, in any particular case. The depth and velocity of the fluidic medium current can be varied with respect to each other, and these and the total flowage volume of the fluidic separating medium can be varied or regulated with respect to the volume or bed of raw coal, and the speed of the latter may also be controlled to meet the conditions or requirements of maximum separating efficiency.

It will be clear, therefore, that the wide and minute regulation of the feed of the fluidic medium independently of the inclination of the bed, or other head imposed, which is provided by my invention, creates an entirely different and novel purifying action and agency not otherwise obtainable. A wide range of variation and regulation in the velocity and depth of flow of the fluidic medium is made possible apart from the structural features of the mechanism. This regulation of the fluidic medium is made or maintained proportional to the likewise regulated volume of raw coal which is fed to the table, as well as being correlated to the physical nature and condition of the particular coal. Thus the purifying action of the fluidic medium, both dynamic, agitational and otherwise is nicely determined and regulated; and in addition the capacity of the table can be regulated and raised greatly above the normal capacity of the mechanism, and to the highest point consistent with efficient commercial purification. Furthermore, these enhanced results are obtained with a minimum amount of the fluidic medium.

It is found efficient or advisable in separating certain kinds of coal to establish in the fluidic separating medium a surface current of desired depth and velocity traveling forwardly over a relatively quiescent body of the fluidic medium to the place of discharge of the forwardly moving layer or bed of coal, or the like, undergoing separation or purification, and the present invention is well adapted to such process. In practicing such process, there is provided or maintained above a relatively quiescent body or mass of the fluidic medium, by the positive, proportional feed of raw coal and fluidic material, a surface current of accurately predeterminable depth, velocity and direction, the current supplying a relatively great en masse or mass movement effect while the entire body of the fluidic medium participates in the separating and purifying process or action. It will be understood that a very strong en masse movement or effect is obtained from the circulation of a relatively small part of the body of fluidic medium while the entire body thereof participates in the sink and float separating action. In this case, the air infiltration may be effected entirely in the relatively quiescent body of the fluidic medium, or both in that body and in the positively fed in stream of fluidic material.

The surface current of the desired velocity and thickness which is created by the positive and regulable feed of the dry fluid medium and the impartation of the desired head, at the desired specific gravity, exert a strong and effective en masse effect upon the supported bed or layer of raw coal, both as to the stratifying and separating action and the propulsive action, while at the same time an exceedingly small amount of the dry fluid medium is handled and circulated in proportion to the effect realized therefrom. When sand or the like is used, most of the trouble and labor of separating the sand from the coal and of recirculating the sand is avoided. At the same time the action of a fuller and deeper bed, with less action in the deeper parts thereof, is realized in the separating action.

In accordance with one feature of the invention, when a relatively quiescent body of fluidic material is employed, there may be created in said body or mass auxiliary flowage or currents of less, and usually of greatly less, velocity than the surface current, which may be directed both upwardly and forwardly toward the front discharge end of the bed. These minor or subordinate flowage or currents when employed may have a sustaining, propulsive and directive effect, exerted primarily upon the surface current of the dry fluid medium rather than directly on the raw coal undergoing separation, and at the same time the relatively quiescent body of fluidic material will continue its participation in the superior current sustaining effect and in the separating action. That is, while the underlying part of the mass or body of fluidic material is relatively quiescent, thereby facilitating the sinking therethrough of the impurities or other heavy material, nevertheless, the fluidic material introduced thereinto may be utilized, in certain cases and under certain conditions, so as to create a relatively slow or gentle upward and forward flow of the fluidic material, which will contribute to sustain and maintain the desired surface current conditions, while yet permitting the ready and complete subsidence of the heavy impurities. With this object in view, the sand, fine coal or other material may optionally be introduced at a plurality of points into the underlying body or mass of the dry fluidic agency in such quantities, at such velocities, and in such directions, as to effect the desired results. In particular cases, a sufficient surface current of the fluidic separating medium may be maintained by supplying new sand, or other fluidic medium, into the main body or mass from below, but the creation of the desired surface flow in the manner already described will usually be found most desirable and efficient.

It will be understood that the foregoing general description, and the following detailed description as well, are illustrative and exemplary, but are not restrictive of the invention.

Figure 1:
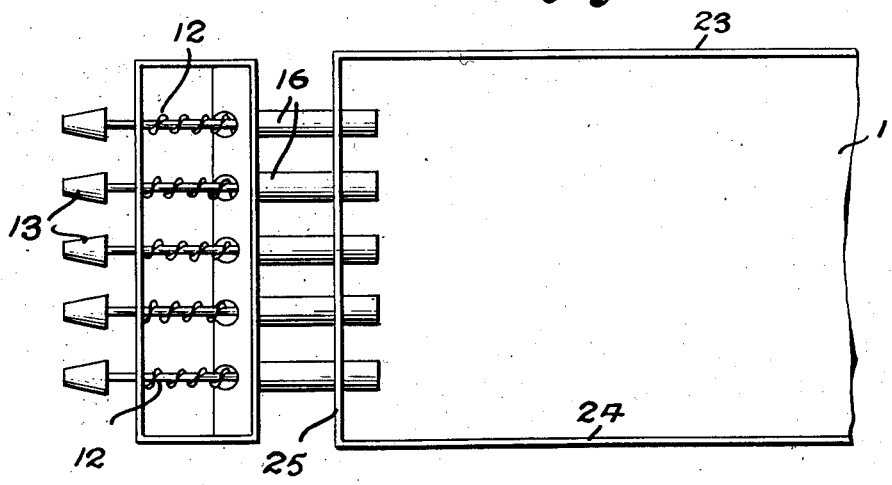
Fig. 1 is a fragmentary top plan of a mechanism embodying the invention.

Referring to the embodiment of the invention illustrated by way of example in the accompanying drawings, the embodied means for creating a positive current of the dry fluidic medium of the depth, velocity and specific gravity desired to most effectively purify a particular kind of raw coal comprises devices for feeding positively to a table 1 a definite regulated amount of dry fluidic medium and infiltrating same to the desired degree with air to render it completely fluid and to secure the particular specific gravity desired. Said embodied means for feeding the dry particulate material comprises a screw feed mechanism or mechanisms 10, shown as a plurality of screw feed devices, side-by-side along the rear end of the table 1. A suitable supply of sand or other fluidic medium is provided, such as a hopper 11, which may be common to a plurality of the screw feeds. The plurality of screw feeds 12 are mounted in the bottom of the hopper, and may work in feed pipes 16 in the usual manner. The screw feeds are driven, respectively, by a variable speed drive 13, which may be of any standard or other suitable construction. While the various screw feeds are shown with individual drives, it might be found convenient or expedient in particular cases to drive them by gear connections from a common variable speed drive. By regulating the speed of the feeds for the sand or other fluidic medium, a positive current flow having the characteristics already described may be established. These feed pipes may be variably positioned both laterally and vertically, and otherwise, as may be found most efficient to secure the current effect desired for the particular table or the particular kind of coal to be purified. In Figs. 1 and 2 the feed pipes 16 are shown arranged in a single plane horizontally and discharging forwardly from the rear of the table. Where it is found to be efficient, they can be made of different lengths, or can be arranged at different vertical positions in groups or otherwise. One such arrangement is shown in Fig. 2. The primary objective is to positively supply an accurately regulated, proportional amount of the sand to create a current flow of the desired or required depth, velocity and direction, and having the specific gravity requisite for most efficient separation of the particular coal being purified.

The air infiltrating means as shown and described in these figures comprises an air chamber 21 extending beneath the table 1, the table having an air-pervious floor 114, side walls 23 and 24, a rear wall 25 and a front wall 26, the side and front walls extending downwardly and forming corresponding parts of the air chamber 21. Air is conveyed to the chamber 21 by suitable means such as a duct 27, and the air may be supplied into the air duct by any suitable device, such as a fan 28 (Fig. 2). To regulate the air supply, the fan may have a variable speed drive, and also, if desired, a shutter 29 on the fan intake. For more localized control of the air infiltration action, the air chamber may be also divided into sub-chambers with means for regulating the admission of the air thereto, as will be described later in connection with Fig. 2.

Means are provided for regulably and variably supplying the raw coal in desired proportional volume to the current flow of the fluidic medium for efficient purification of a particular coal, and as embodied (Fig. 2) a hopper 37 is provided having a variable speed feeding device 38 in the bottom thereof feeding the coal onto and across the rear end of the table and onto the current of fluidic medium. As embodied, the feed device comprises a horizontally-disposed shaft 41, journalled in the open, parti-cylindrical bottom of the hopper, the shaft having discs 42 fixed thereon, and a plurality of tangentially disposed blades 43 extending along the shaft and between the discs, and rotating within the cylindrical part of the hopper bottom. By varying the speed of rotation of this device the volume of feed may be very accurately determined, and the volume of raw coal and fluidic medium, as well as the depth and velocity and direction of the currents be coordinated so as to effect the most efficient separation of the particular coal. Means are provided further by the invention for varying the head imparted to the current of fluidic medium, and for this purpose the upper part of the front wall of the table comprises a vertically-disposed plate 241, which projects upwardly from the top edge of the wall 26, and is connected thereto by bolt and slot connection 242. A suitable lip or chute 243 extends forwardly from plate 241 to deliver the coal to the reciprocable screen 244.

In the operation of the mechanism previously described, as already indicated, the volume of raw coal and the volume of fluidic material positively fed to the table are proportioned to meet the needs or conditions of the particular coal being purified, the air infiltration action being also coordinated therewith.

The positively created, relatively rapidly moving current of fluidic medium receives the flow of raw coal as a continuous bed upon its surface, and exerts a strong mass dynamic or propulsive forward movement on the coal bed, such movement also facilitating and expediting the separating action, partly by loosening the particles and effecting a continual interaction and change of position among the particles and pieces. The pure coal will float, or will sink at an exceedingly slow rate, and will be carried forward with the stream of the fluidic medium and be discharged at the front of the bed, while the heavy refuse will sink rapidly to the bottom and be discharged from the bottom of the table. By proper regulation of the flowage of the fluidic medium, a buoyant coefficient may be created which will coact with the specific gravity in determining the effective or practical splitting point. The system may be regulated to substantially bring the top of the current flow just above the front spillage edge of the table. Thus, a relatively small quantity of sand or other fluidic medium is required for the separating action, with a consequent minimum of separation of sand from the pure coal and refuse, and reconveyance and handling of sand. At the same time, due to the positive impartation or creation of a current flow of considerable velocity and depth, the capacity of the table is very greatly increased over that secured by a purely gravitational flow. The specific gravity and velocity will be such that all of the refuse will sink downwardly through the current and come to rest at the bottom of the table or upon the ejector mechanism, and the pure coal will either be floated upon the current or will sink so slowly that the current flow will carry it to the place of discharge for the pure coal.

In accordance with one feature of the invention means are provided for positively creating a surface current of desired depth and velocity of the kind already described, but in this case the current moves over, and is supported by, an underlying relatively quiescent body or bed of the fluidic medium, and in this case a table of relatively greater depth is provided. A table is shown in Fig. 2 having a conical air-pervious bottom 82, the upper edges of which are attached to the side walls 83, the rear wall 84 and the front wall 85 of the table. The central part of the conoidal air-pervious member 82 has a refuse-discharge opening 87 therein communicating into a discharge pipe 88. A gate 89 is provided at the opening 87, said gate being slidable to regulate the outflow of refuse to the pipe 88. The gate 89 is connected to a rod 90 which is longitudinally movable to position the gate to vary the size of the discharge opening as desired. At its bottom or discharge end, pipe 88 is provided with a gate 90, pivoted at 91, and having a pin 92 fixed thereto, upon which pin weights 93 are hung. Thus a desired degree of resistance may be opposed to the opening of the gate against the weight of settled refuse in pipe 88. By regulating the gate opening 89 and the weight 93, hung upon gate 90, pipe 88 may be kept approximately full of refuse, and the amount of sand that is discharged with the refuse will be reduced to a minimum. In this form of mechanism, the feed device 11 for the sand or like material will create the surface current flowing over the relatively quiescent body of fluidic medium from the place of feeding-on of the raw coal to the place of discharge of the pure coal.

In connection with the maintenance and operation of the relatively quiescent body of fluidic material and the positive current flow thereover, it may be found efficient in purifying various coals to have auxiliary or subordinate currents of relatively small intensity moving upwardly through the otherwise quiescent interior body of fluidic material, and for this purpose there is shown in Fig. 2 auxiliary feeding mechanisms 108 and 109 for the fluidic material. These may be positioned wherever desired, and the rate of feed thereof may be regulated proportionately to the feed 11 to give the desired auxiliary upward current effect.

In all of the exemplary forms of mechanisms shown and described there may be used, if desired, localized control of the air action so as to independently control the air infiltration action in different parts of the table or of the body of fluidic medium. An embodiment of such air control is shown in Fig. 2, in which the air chamber 21 is divided into a plurality of sub-chambers by partitions 113, formed upon a perforate floor 114. Corks 115 may be used in the openings in the floor 114 to control the air flow into each of the chambers, and therefore the air infiltration in the body of fluidic medium just above.

In Fig. 3 is exemplarily shown one form of device for infiltrating air with the fed in sand or other fluidic material. As shown, an air pipe 125 incloses a perforate portion 126 of the pipe which supplies the fluidic material, the air thus being fed in with the particulate material.

In Fig. 4 of the drawings is shown a modified form of the invention wherein a complete circulatory or endless flow of the fluidic medium is effected, and preferably in connection therewith devices or means for keeping the superior forward flow and the interior return flow of the fluidic medium separated, so that there may not be any substantial interference between the two parts of the circulatory flow of the fluidic medium. Said means is also constructed to permit free passage of the separated heavy refuse, and settlement thereof to the bottom of the bed. As exemplarily embodied in Fig. 4, the variably regulable supply means for the raw coal is the same as shown in the other figures, and as already described. The table in this form has a rear wall 127, a front wall 128 and side walls 129. The air-pervious bottom 130 is shown connected to the side and end walls and inclined inwardly and downwardly therefrom to a refuse outlet 131, the inclination assisting in the collection of the refuse. A discharge chute 132 extends from outlet 131 outwardly through the air chamber, and is preferably provided with a pivoted and weighted discharge regulating gate 133. Refuse is discharged onto a screen 134, which separates the refuse and the sand, or other fluidic material, the latter being returned to the system. The means for infiltrating air into the fluidic medium is the same or substantially similar to that shown in Fig. 2, and need not be again described.

In this embodiment of Fig. 4, the fluidic medium or material is positively fed in a forwardly direction, and substantially at the level of the top of the bed of fluidic medium by suitable means, such as the screw feeds already described and indicated generally in Fig. 4 by the reference numeral 139. These may have a regulable or variable speed drive, such as is indicated at 140. Means are provided within the bed for directing the flow of fluidic medium forwardly and at the same time permitting easy settlement of the separating and separated refuse. As embodied, a plurality of plates 143 are arranged across the table from one side wall 29 to the other, these plates being spaced apart, and the rearward edge 144 thereof being preferably inclined downwardly. Thus as the fluidic medium is fed positively forwardly, it flows over the plates 143 and tends to keep a uniform level across the bed, and the settled refuse will sink downwardly in the spaces 145 between the plates. The series of plates 143 are vertically variably positionable, as by bolt and slot mountings 142. This device can be used to regulate the depth and direction of the forward surface current, whether the return circulatory current is employed or not.

At the forward end of the bed means are provided for imparting a variable head to the stream of fluidic medium, together with a skimming device for splitting the clean coal from the bed and preventing the out-flow of any unnecessary sand, or other fluidic medium. As embodied, a plate 151 is vertically positionably mounted on the front wall 128 of the table by means of a bolt and slot connection 152. The splitting blade 153 is likewise mounted on the plate 151, and may be made variably positionable with reference thereto if desired. A discharge chute 154 delivers the pure coal to a screen 155 where it is desanded. The chute 154 is also vertially variably positionable as desired. The sand separated from both the refuse and the coal is returned to the system.

The embodied form of means for creating the inferior return current comprises a curved chute 161 adapted to receive the onflowing superior current of the fluidic medium and to deliver it to a plurality of feed screws 162, which give a positive rearward feed to the flowing medium. The feed screws 162 are provided with a variable speed drive 163. In certain cases and mechanisms it will be found satisfactory to dispense with the positive return feed, and effect the circulatory return current by means of the directive devices alone. Means are also preferably provided for maintaining a uniformly horizontal direction for this return flow of fluidic medium, and as shown, a plurality of spaced-apart plates 166 are arranged across from one side wall 129 to the other. These plates are vertically adjustable by suitable means such as the bolt and slot connections 167. The refuse will sink downwards through the intervening openings 168. At the rear of the table there is preferably provided a plate 170 which directs the return current of the fluidic material upwardly and forwardly in the direction of the feed of the devices 139. Thus a positively-actuated, forwardly-moving current of precisely the desired depth, velocity and head can be maintained and varied from time to time almost instantaneously to meet the requirements of the most efficient purification of the coal. At the same time the positive in-feed of additional sand or other fluidic medium, and the recirculation thereof is reduced to a minimum as compared to the dynamic, agitational, and other separating effect imparted by the currents in addition to the fundamental sink-and-float action of the fluidic medium. The fine regulation of the current flow is effected by the independent regulation for the feed devices both at the rear end and the front end of the table and the vertical adjustment of the series of plates 143 and 166.

The invention in its broader aspects is not limited to the specific mechanisms shown and described but departures may be made therefrom within the scope of the accompanying claims without departing from the principles of the invention and without sacrificing its chief advantages.

What I claim is:—

1. Mechanism for purifying raw coal including in combination means for producing a circulatory current of particulate fluidic medium having superior and inferior reaches substantially parallel to the surface of the medium, means for proportionally feeding raw coal to the superior reach of the current, and means for delivering the purified coal therefrom.

2. Mechanism for purifying raw coal including in combination means for producing a circulatory current of particulate fluidic medium having superior and inferior reaches substantially parallel to the surface of the medium, means for varying the velocity of said current, means for proportionally feeding raw coal to the superior reach of the current, and means for delivering the purified coal therefrom.

3. Mechanism for purifying raw coal including in combination means for producing a circulatory current of particulate fluidic medium having superior and inferior reaches substantially parallel to the surface of the medium, means for varying the depth of the superior reach of said current, and means for proportionally feeding raw coal to the rear of the superior reach of the current, and means for delivering the purified coal from the forward part of said superior reach.

4. Mechanism for purifying raw coal including in combination means for producing a circulatory current of particulate fluidic medium having superior and inferior reaches substantially parallel to the surface of the medium, means for varying the depth of the inferior reach of said current, means for proportionally feeding raw coal to the rear of the superior reach of the current, and means for delivering the purified coal from the forward part of said superior reach.

5. Mechanism for purifying raw coal including in combination means for producing a circulatory current of particulate fluidic medium having superior and inferior reaches substantially parallel to the surface of the medium, means for varying the depth of the superior and inferior reaches of said current and the vertical positions with respect to each other, means for proportionally feeding raw coal to the rear of the superior reach of the current, and means for delivering the purified coal from the forward part of said superior reach.

6. Mechanism for purifying raw coal including in combination means for producing a circulatory current of particulate fluidic medium having superior and inferior reaches substantially parallel to the surface of the medium, means for proportionally feeding raw coal to the rear of the superior reach of the current, and means for delivering the purified coal from the forward part of the superior reach and means for delivering the settled refuse from the bottom part of said particulate fluidic medium.

7. Mechanism for purifying raw coal including in combination a body of particulate fluidic medium, means for delivering raw coal upon said medium, means for effecting a flow of the upper part of said medium away from said feeding point for the raw coal to a discharge point, means for effecting an inferior return flow of the fluidic medium toward said coal feeding point, and means for discharging the flotant pure coal.

8. Mechanism for purifying raw coal including in combination a body of particulate fluidic medium, means for delivering raw coal upon said medium, means for effecting a flow of the upper part of said medium away from said feeding point for the raw coal to a discharge point, means for effecting an inferior return flow of the fluidic medium toward said coal feeding point, means for supplying fluidizing air and for locally controlling the action of the air in different parts of the body of fluidic medium and means for discharging the flotant pure coal.

9. Mechanism for purifying raw coal including in combination a body of particulate fluidic medium, means for delivering raw coal upon said medium, means for effecting a flow of the upper part of said medium away from said feeding point for the raw coal to a discharge point, means for effecting an inferior return flow of the fluidic medium toward said coal feeding point, means for directing said upper flow downwardly near the discharge point, means for directing the inferior flow upwardly near the delivery point for the raw coal, and means for discharging the flotant pure coal.

10. The process of purifying raw coal which comprises maintaining a body of dry particulate fluidic medium without bodily translational movement, forcing the particulate medium at and near the surface of the body in a current away from a feeding locus toward a discharge locus and causing a return flow by an inferior current from the discharge locus to the feeding locus, feeding raw coal to the top of the fluidic body at the feeding locus and discharging purified coal from the superior current at the discharge locus.

11. The process of purifying raw coal which comprises maintaining a body of dry particulate fluidic medium without bodily translational movement, forcing the particulate medium at and near the surface of the body in a current away from a feeding locus toward a discharge locus, forcing an inferior portion of the fluidic body as a return current from the discharge locus to the feeding locus, feeding raw coal to the top of the fluidic body at the feeding locus and discharging purified coal from the superior current at the discharge locus.

12. The process of purifying raw coal which comprises maintaining a body of dry particulate fluidic medium without bodily translational movement, forcing the particulate medium at and near the surface of the body in a current away from a feeding locus toward a discharge locus and causing a return flow by an inferior current from the discharge locus to the feeding locus, directing the superior current downwardly near the discharge locus and the inferior current upwardly near the feeding locus, feeding raw coal to the top of the fluidic body at the feeding locus and discharging purified coal from the superior current at the discharge locus.

JOHN D. MORGAN.